(12) United States Patent
Eggimann et al.

(10) Patent No.: US 12,192,346 B2
(45) Date of Patent: Jan. 7, 2025

(54) ENHANCED SECURITY IN SENSITIVE DATA TRANSFER OVER A NETWORK

(71) Applicant: MASTERCARD INTERNATIONAL INCORPORATED, Purchase, NY (US)

(72) Inventors: Christopher Eggimann, Brooklyn, NY (US); Manu Dharmaiah Kallugudde, Berkshire (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 44 days.

(21) Appl. No.: 18/118,107

(22) Filed: Mar. 6, 2023

(65) Prior Publication Data

US 2023/0208632 A1 Jun. 29, 2023

Related U.S. Application Data

(63) Continuation of application No. 17/001,863, filed on Aug. 25, 2020, now Pat. No. 11,611,434.

(30) Foreign Application Priority Data

Oct. 18, 2019 (EP) .................................. 19204108

(51) Int. Cl.
*H04L 9/08* (2006.01)
*H04L 9/32* (2006.01)

(52) U.S. Cl.
CPC ............ *H04L 9/0863* (2013.01); *H04L 9/088* (2013.01); *H04L 9/3213* (2013.01); *H04L 9/3242* (2013.01); *H04L 2209/56* (2013.01)

(58) Field of Classification Search
CPC ..... H04L 9/0863; H04L 9/088; H04L 9/3213; H04L 9/3242; H04L 2209/56;
(Continued)

(56) References Cited

U.S. PATENT DOCUMENTS 8,768,803 B2 7/2014 DeWanz et al.
9,769,142 B2 * 9/2017 Zhang ..................... H04L 63/10
(Continued)

FOREIGN PATENT DOCUMENTS

WO WO2011/127177 10/2011
WO WO2019/013854 1/2019

OTHER PUBLICATIONS

U.S. Appl. No. 17/001,863, filed Aug. 25, 2020, Eggimann et al.
(Continued)

*Primary Examiner* — Abu S Sholeman
(74) *Attorney, Agent, or Firm* — Harness, Dickey & Pierce, P.L.C.

(57) ABSTRACT

The present disclosure relates to a computer-implemented method and to a system for authenticating a transaction over a secure network. The method comprises, prior to authorization of a transaction: receiving, by a digital service server, from a merchant plug-in (MPI) computing device, via a directory server, a token and a first cryptogram for the transaction; decrypting, by the digital service server, the token into sensitive data; generating, by the digital service server, a first message including a validation result and the sensitive data; and transmitting, by the digital service server, the first message to an issuer server to authenticate the transaction.

14 Claims, 5 Drawing Sheets

(58) Field of Classification Search
CPC .. G06Q 20/02; G06Q 20/3825; G06Q 20/385; G06Q 20/4014; G06Q 20/4016; G06Q 20/12

See application file for complete search history.

(56) References Cited

U.S. PATENT DOCUMENTS

| | | | |
|---|---|---|---|
| 2007/0100691 A1 | 5/2007 | Patterson | |
| 2008/0154770 A1 | 6/2008 | Rutherford et al. | |
| 2008/0283594 A1 | 11/2008 | Unbehagen | |
| 2011/0161671 A1 | 6/2011 | Whitehouse | |
| 2011/0208658 A1 | 8/2011 | Makhotin | |
| 2011/0225094 A1 | 9/2011 | Hammad | |
| 2011/0251892 A1 | 10/2011 | Laracey | |
| 2012/0041881 A1 | 2/2012 | Basu et al. | |
| 2012/0221468 A1 | 8/2012 | Kumnick et al. | |
| 2013/0132283 A1* | 5/2013 | Hayhow | G06Q 20/1085 705/67 |
| 2014/0025577 A1 | 1/2014 | Lisznianski | |
| 2014/0129441 A1 | 5/2014 | Blanco et al. | |
| 2015/0161603 A1 | 6/2015 | Fish | |
| 2015/0262180 A1 | 9/2015 | Hambleton et al. | |
| 2015/0317632 A1* | 11/2015 | Park | G06Q 20/24 705/75 |
| 2015/0371226 A1 | 12/2015 | Hurley et al. | |
| 2016/0034870 A1 | 2/2016 | Howe et al. | |
| 2016/0036790 A1 | 2/2016 | Shastry et al. | |
| 2016/0125417 A1 | 5/2016 | Huang et al. | |
| 2016/0162886 A1 | 6/2016 | Howe | |
| 2016/0321652 A1* | 11/2016 | Dimmick | H04L 63/083 |
| 2017/0161733 A1 | 6/2017 | Koletsky et al. | |
| 2017/0178137 A1 | 6/2017 | Pachouri et al. | |
| 2017/0345008 A1 | 11/2017 | Ford et al. | |
| 2017/0366530 A1 | 12/2017 | Dominguez et al. | |
| 2018/0108008 A1 | 4/2018 | Cumbley | |
| 2018/0197174 A1 | 7/2018 | Daetz | |
| 2018/0322489 A1 | 11/2018 | Altenhofen et al. | |
| 2019/0020478 A1 | 1/2019 | Girish et al. | |
| 2019/0026735 A1 | 1/2019 | Parekh | |
| 2019/0108515 A1* | 4/2019 | Lakka | G06Q 20/401 |
| 2019/0318345 A1 | 10/2019 | Kallugudde | |
| 2020/0382486 A1 | 12/2020 | Dunjic et al. | |
| 2021/0036856 A1* | 2/2021 | Wang | H04L 9/0894 |
| 2021/0117967 A1 | 4/2021 | Eggimann et al. | |
| 2021/0119790 A1 | 4/2021 | Eggimann et al. | |
| 2022/0012710 A1* | 1/2022 | Wang | G06Q 20/208 |

OTHER PUBLICATIONS

U.S. Appl. No. 17/001,880, filed Aug. 25, 2020, Eggimann et al.

U.S. Appl. No. 17/001,863: (a) Office Action dated Oct. 13, 2021; (b) Office Action Mar. 3, 2022; (c) Notice of Allowance dated Aug. 9, 2022; (d) Notice of Allowance dated Oct. 27, 2022; and (e) Corrected Notice of Allowability dated Feb. 15, 2023. The instant application is a continuation of U.S. Appl. No. 17/001,863.

EP 19204108.5: (a) Extended European Search Report, dated Apr. 8, 2020 (9 pgs.); and (b) Office Action dated Apr. 11, 2022 (9 pgs.). The instant application claims priority to European Patent Application 19204108.5.

U.S. Appl. No. 17/001,880: Office Action dated Aug. 9, 2022; (b) Office Action dated Dec. 13, 2022. U.S. Appl. No. 17/001,880 has the same inventors and the same Applicant, Mastercard International Incorporated, as the instant application and may include subject matter in common with the instant application.

EP 19204011.1: Extended European Search Report, dated Apr. 30, 2020 (8 pgs.). European Patent Application 19204011.1 has the same inventors and the same Applicant, Mastercard International Incorporated, as the instant application and may include subject matter in common with the instant application.

Mastercard International Incorporated, as thr instant application and may include subject matter in common with the instant application. EMV® 3-D Secure™ protocol/specification; https://www.emvco.com/emv-technologies/3d-secure/; 2020 ©; 6 pgs.

EP 19204011.1: Examination dated Jun. 15, 2023. EP19204011.1 has the same inventors and the same Applicant, Mastercard International Incorporated, as the instant application. As a note, the reference cited therein is already of record in the instant application.

* cited by examiner

ENHANCED SECURITY IN SENSITIVE DATA TRANSFER OVER A NETWORK

CROSS-REFERENCE TO RELATED APPLICATIONS

This application is a continuation of U.S. patent application Ser. No. 17/001,863, filed on Aug. 25, 2020, which claims the benefit of, and priority to, European Patent Application No. 19204108.5, filed on Oct. 18, 2019. The entire disclosure of each of the above applications is incorporated herein by reference.

FIELD

This disclosure relates generally to data security, and specifically to the transmission of a sensitive data payload for authorizing a transaction over a network in a reliable and secure manner.

BACKGROUND

This section provides background information related to the present disclosure which is not necessarily prior art.

In systems involving several data processing devices connected over a network, a sensitive data payload is often needed to be passed between these data processing devices. Typically the party or parties seeking to protect the sensitive data do not have control over at least some of the network links over which the sensitive data payload is transmitted, e.g., in the case where a network link involves a public network component, such as a transmission over the internet. The trust level of such links may be less than ideal, which can enable an unauthorized party to intercept communications over these links, e.g., in a 'man in the middle' attack.

One example of a system where this consideration comes into play is a system that implements a payment transaction between a merchant and a customer using a payment card or device. The merchant needs to contact an authentication entity on the network to receive a token, which then acts as customer's payment credentials. The authentication entity performs the validation with the issuer and generates the token and sends the token back to the merchant. Typically, both token and dynamic data, which provides domain control and validates the merchant, are sent during authorization and verified by the authentication entity during authorization. However, in a 3D secure transaction, known in the art, dynamic data is omitted and therefore the security of the transaction is limited.

An unauthorized party, referred to herein as an eavesdropper, seeking to perpetrate fraud may be able to leverage any insecure points within the network path so as to intercept the token as it is passed from the merchant to the issuer. This may be achieved by a 'man in the middle' attack where the unauthorized party extracts data from a communication session between two authorized parties so as to gain access to data transmitted in the communication session. With the limited security provided by just the token, a fraudster can perform replay attacks or can act as a legitimate merchant.

Another example of a system where this consideration comes into play is in an Internet of Things (IoT) system. An authentication server may control access to an IoT network that has a primary node and one or more secondary nodes. The secondary nodes may need to provide authentication credentials in order to successfully join the IoT network, where the secondary node obtains an authentication credential from the primary node over a network link that may not be secure. A man in the middle attack could cause the primary node to transmit the authentication credential to an unauthorized node instead of, or in addition to, the secondary node, potentially enabling the unauthorized node to gain access to the IoT network.

In the first example of payment transaction, one way of ensuring the security of transaction is for the issuer to verify the transaction and the merchant, followed by consumer authentication. The issuer may pose one or more security questions or use other means to verify that the transaction is made by a genuine customer. This solution however requires use of additional network and device resources, which may not be justified if the transaction is actually made by the genuine customer. Moreover, this also delays the processing of the transaction. Furthermore, as the customer is required to perform an extra step for the transaction to get approved, the overall user experience is negatively affected.

Therefore, the present disclosure is aimed at resolving one or more of the problems mentioned above and in particular processing a transaction in a reliable, secure, and timely manner.

SUMMARY

This section provides a general summary of the disclosure, and is not a comprehensive disclosure of its full scope or all of its features. Aspects and embodiments of the disclosure are set out in the accompanying claims.

According to a first aspect of the disclosure, there is provided a computer-implemented method for authenticating a transaction over a secure network. The method comprising: receiving, by a first authentication server, a sensitive data payload and a cryptogram, wherein the first authentication server is configured to either receive or generate a token associated with the sensitive data payload; transmitting, by the first authentication server, the token and the cryptogram to a second authentication server, wherein the second authentication server is configured to validate the token and the cryptogram and generate a first message including a validation result; transmitting, by the second authentication server, the first message to an issuer server to authenticate the transaction; and reviewing, by the issuer server, the validation result and generating an authentication value including a validation flag based on the review of the validation result.

According to a second aspect of the disclosure, there is provided a system for authenticating a transaction on a secure network. The system comprising: a first authentication server configured to receive a sensitive data payload and a cryptogram and either receive or generate a token associated with the sensitive data payload; a second authentication server configured to validate the token and the cryptogram and generate a first message including a validation result; and an issuer server configured to review the validation result and generate an authentication value including a validation flag based on the review of the validation result.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. That said, embodiments of the present disclosure are described below, by way of example only, with reference to the accompanying drawings, in which.

Corresponding reference numerals indicate corresponding parts throughout the several views of the drawings.

DETAILED DESCRIPTION

Figure 1:
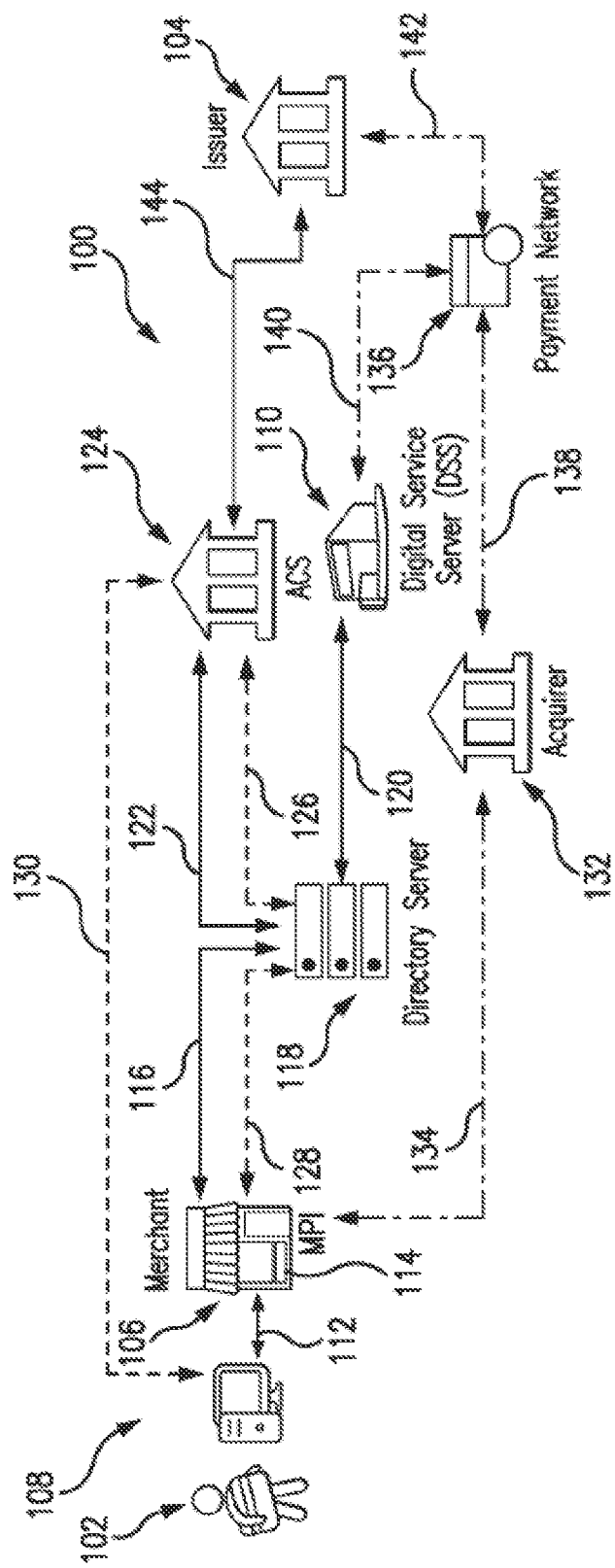
FIG. 1 shows a system for authenticating and approving a transaction between a customer and a merchant in accordance to an aspect of the disclosure.

Embodiments will be described, by way of example only, with reference to the drawings. The description and specific examples included herein are intended for purposes of illustration only and are not intended to limit the scope of the present disclosure.

As used herein, the followings terms have the following meaning:

Sensitive data: data that should be exposed in cleartext form to authorized entities only. Examples of sensitive data include a Primary Account Number (PAN), a private key, and an authentication credential.

Token: an entity that acts as a placeholder for a corresponding item of sensitive data, where typically the token is generated in some predictable manner from the sensitive data item such that entities in possession of the knowledge of how the token was generated can obtain the sensitive data from the token. An example of a token is an alphanumeric string that is generated based on a PAN.

Cryptogram: Dynamic data for transaction to ensure domain controls and to perform transaction validations.

Secure storage medium: a storage medium that only authorized entities can retrieve data from. An example of a secure storage medium is a data store that is accessible only via a private network or virtual private network. Access may be granted only upon provision of an authentication credential, e.g., a password. A secure storage medium may include one or more encrypted volumes.

Eavesdropping: the act or process of infiltrating a communication channel so as to intercept data transmitted over said channel, as committed by a party that is not authorized to gain access to data transmitted over said channel. Eavesdropping is typically a fundamental part of a man in the middle attack.

Trusted channel: a communications path that is hardened against attempts to gain access by unauthorized third parties, e.g., by eavesdropping. A virtual private network (VPN) or a private network are examples of trusted channels.

Public network component: a network component, such as a switch, router, server, etc., that is accessible by any data processing device. Typically, little or no authentication is required to access a public network component.

Various aspects of the disclosure are now described with reference to the accompanying drawings. The description and specific examples included herein are intended for purposes of illustration only and are not intended to limit the scope of the present disclosure.

Payment accounts are widely used by customers to fund transactions for products at merchants (e.g., transactions for goods, services, etc.). To avoid issues related to fraudulent and/or unauthorized transactions, issuers associated with the payment accounts and payment networks associated with processing the transactions often impose added authentication and validation techniques/services for the customers initiating the transactions. Traditionally, though, such authentication and validation techniques are only utilized in card-present transactions.

However, increasingly added authentication and validation techniques are being utilized for e-commerce transactions, which are more generally card-not-present, or CNP, transactions. Examples of such CNP transactions are online purchases made over the internet or phone, payments made by mail or fax, etc.

FIG. 1 illustrates an exemplary system 100 for implementing a process that may be utilized for authenticating and verifying a customer in connection with a transaction by the customer, and which is consistent with the EMV® 3-D Secure™ protocol/specification, for example. It should be appreciated, however, that not all details of the EMV® 3-D Secure™ protocol/specification are discussed herein, since a complete detailed disclosure of such information may be readily understood by referencing the EMV® 3-D Secure™ protocol/specification and or discussions thereof. In addition, the illustrated system 100 includes a plurality of entities that interact with each other by exchanging multiple, specifically formatted messages over secure communication channels (e.g., as defined in the EMV® 3-D Secure™ protocol/specification (see, e.g., https://www.emvco.com/emv-technologies/3d-secure/), etc.). Accordingly, and as can be appreciated, the authentication illustrated in FIG. 1 is complex given the number and extent of entities, messages, and other requirements necessarily involved.

In the present embodiment, the system 100 includes a customer 102 associated with a payment account, where the payment account is issued to the customer 102 by an issuer 104 and is useable by the customer 102 to fund purchase transactions with one or more merchants (e.g., merchant 106, etc.). The customer 102 may hold a payment card issued by the issuer 104 for making purchase transactions. The customer 102 is also associated with a computing device 108, which is configured to access one or more virtual merchant locations. The computing device 108 may include, for example, a tablet, a smartphone, a laptop, a desktop, or other similar electronic device, which enables the customer 102 to interact and/or communicate with the one or more merchants (e.g., via websites and/or network-based applications provided by the merchants, etc.). Also, the computing device 108 includes a wallet application (not shown), which is configured to provide payment account credentials for the customer's payment account, for example, in connection with payment account transactions. In this embodiment, the wallet application includes a virtual wallet application, which may include, without limitation, Masterpass® from Mastercard®, Apple Pay® from Apple®, Visa Checkout®, Google Pay® from Google®, etc. Upon installation and/or activation, the wallet application, and more generally, the computing device 108, is provided with and/or provisioned with a public/private key pair or one or more symmetric keys for use as described below, to generate cryptograms per transaction performed by the customer 102 using his/her payment account (through the wallet application). The keys may be provided by a digital service server (DSS) (e.g., DSS 110, etc.), or a payment network (e.g., payment network 136, etc.), or otherwise, etc. Details of the computing device 108 and other computing devices identified herein (e.g., authentication devices, servers, etc.) are described more fully below, with reference to FIG. 5.

The merchant 106 in the system 100 includes, in present embodiment, a virtual merchant having a virtual merchant location, such as, for example, a website, a network-based application, etc., which is accessible by the customer 102 via the computing device 108. The merchant virtual location may be managed and/or provided directly by the merchant 106, or by another entity on behalf of the merchant 106, etc.

In general in the system 100, the customer 102 has previously accessed and/or interacted with the merchant 106 at the virtual merchant location, whereby the merchant 106 includes a profile for the customer 102, which includes payment credentials for the customer's payment account. In connection therewith, the merchant 106, or other entity, is configured to request a token from DSS 110 (e.g., which may be embodied in and/or include a token service provider (TSP), etc.) in connection with generating the profile for the customer 102, for example, for later use in connection with a payment account transaction by the customer 102 at the merchant 106. The DSS 110 includes, in this exemplary embodiment, the Mastercard™ Digital Enablement Service (MDES) server, but may include one or more other servers in other embodiments, etc. In any case, in response to such token request, the DSS 110 generates the token specific to the customer's payment account and maps the token to a primary account number (PAN) for the payment account (e.g., in a data structure associated with the DSS 110, etc.). The DSS 110 further returns the token to the merchant 106, directly or via the virtual wallet application at the computing device 108, whereby the merchant 106 then stores the token in association with the customer's profile for later use by the customer 102 in future transactions with the merchant 106 (e.g., "on file," etc.). For subsequent transactions with the customer 102, the merchant 106 may then use the token to identify the funding payment account for the transaction.

Alternatively, the DSS 110 may generate and provide a token to the virtual wallet application in the computing device 108, which in turn, stores the token therein. Then, for a subsequent transaction, the virtual wallet application provides the token as stored therein, rather than relying on the token "on-file" at the merchant 106. Further, for subsequent transactions, the customer 102, or the virtual wallet application in the computing device 108, may directly provide an account number (e.g., a PAN, etc.) to fund the further transaction, instead of relying on the token "on-file" at the merchant 106 or the token provisioned to the virtual wallet application.

As such, transactions between the customer 102 and the merchant 106 may include one or more tokens, or an account number (e.g., a PAN, etc.) provided by the customer 102. Each type of transaction is processed as described below.

Specifically, in the system 100, when the customer 102 browses one or more products (e.g., goods, services, etc.) at the merchant 106, via the computing device 108 and at the merchant's virtual location, the customer 102 may select to purchase a product and further provide details related to the transaction and an input at the computing device 108 to then checkout, via path 112. The checkout details and input, received from the customer 102, may include, for example, a selection of the payment account corresponding to the token already received and stored at the merchant 106. Or, the checkout details and input may include the customer 102 providing a token, an account number for the same payment account (for which the token has already been received), or an account number for a different payment account, and/or other details of the transaction.

In response to the checkout input (and/or details provided in connection therewith), the merchant 106 is configured to interact with the computing device 108, whereby the computing device 108, as configured by the wallet application (not shown), generates a cryptogram based on the public-private key pair, or on the symmetric key (e.g., a secret key generated by a symmetric algorithm, etc.), which is associated with the customer's payment account and wallet application (and known to or shared with the DSS 110, for example). The cryptogram may be generated by the virtual wallet application, locally at the computing device 108 (e.g., a digital secure remote payment (DSRP) generated by the wallet), or it may be generated based on one or more interactions with other systems (e.g., a digital secure remote payment (DSRP) service incorporated into the DSS 110, or other system(s), etc.) (e.g., via cloud service(s), etc.) and provided to the merchant 106 via the virtual wallet application. In this embodiment, the cryptogram also includes the details of the merchant, such as merchant ID, type, address, etc. The cryptogram is unique to each transaction and is dynamically generated for each new transaction between the customer 102 and one or more merchants 106. The cryptogram may also include the information, such as merchant ID, name, address, and the nature of transaction. Therefore, the cryptogram provides an added layer of security to the transaction. The computing device 108, as configured by the wallet application, transmits the cryptogram to the merchant 106.

In addition, the wallet application (either locally at the computing device 108 or at one or more backend servers) maintains an application transaction count (ATC) and increments the ATC for every cryptogram generated for the customer's payment account (i.e., either specific to the token for the payment account, or not). In the current embodiment, the ATC is specific to the token, whereby even when a payment account has multiple tokens, each of the tokens would be associated with a particular ATC, for example, to inhibit reply attacks associated therewith.

When the cryptogram is received at the merchant 106, a merchant server plug-in (MPI) 114 associated with the merchant 106 is configured to compile an authentication request (AReq) for the transaction. When the transaction involves a token provisioned to the merchant 106, the AReq includes at least the token and the cryptogram received from the computing device 108. Alternately, when the transaction does not include the token, the AReq includes at least an account number for the customer's payment account, such as, for example, the PAN, etc., and the cryptogram. The MPI 114 is configured to then transmit the AReq, via path 116, to a directory server 118 included in the system 100. While the exemplary system 100 includes the MPI 114, it should be appreciated that the MPI 114 may be one or more other servers and/or services as is suitable to the particular enhanced authentication included herein (e.g., whereby the MPI 114 may be referred to as a 3DS server (for EMV 3DS specification), etc.), or otherwise.

In this embodiment, when the AReq includes the token provisioned to the merchant 106, the directory server 118 is configured to receive the AReq and to transmit the token and the cryptogram, from the AReq, to the DSS 110, via path 120.

The DSS 110, in turn, is configured to decrypt, or detokenize, the received token to map it to the account number (e.g., the PAN, etc.) for the customer's payment account and to generate a directory server nonce (DSN). The DSN may include a number, for example, an unpredictable number, utilized to provide entropy into the AAV and/or an issuer authentication value (IAV) associated therewith. In addition, the DSS 110 is configured to validate the received cryptogram for the transaction (i.e., perform a cryptographic key validation). Specifically, the DSS 110 is configured to diversify a master key from the issuer master symmetric key (e.g., a key generated, by the DSS 110, for the issuer 104, etc.) and then to diversify one or more session keys from the master key (e.g., based on the ATC maintained by the DSS 110, etc.). The DSS 110 is configured to use the session key(s) to validate the cryptogram received from the directory server 118. Further, when the cryptogram is validated, the DSS 110 is configured to increment the ATC, for example, by recording the ATC value as a used value (thereby potentially preventing its repeated use), etc. The DSS 110 is also configured to generate a validation result including the outcome of validation of the token and the cryptogram. If either the token or the cryptogram is manipulated by an eavesdropper on the network, the DSS 110 records that information in the validation result.

The DSS 110 is also configured to return the account number and the DSN back to the directory server 118, again via path 120. In at least one embodiment, for example, where the AReq includes neither a token nor a cryptogram, the directory server 118 may generate the DSN, rather than receiving the DSN from the DSS 110.

Thereafter, when the directory server 118 receives the account number and the validation result from the DSS 110, or when the original AReq includes the account number, the directory server 118 may be configured to compress certain data associated with the transaction. For example, the directory server 118 may be configured to determine a logarithm of the transaction amount (i.e., a log amount), thereby compressing data used to present the amount (e.g., a six byte value for the amount may be encoded in two bytes with a potential error of less than +/−0.02%, etc.). The directory server 118 may further be configured to determine a truncated hash of the merchant ID for the merchant 106, again, thereby compressing the data used to represent the merchant ID. With that said, it should be appreciated that the directory server 118 may be configured to apply one or more different techniques to compress data to be used herein, or not, in other embodiments.

The directory server 118 is configured to then provide, for example, the AReq, with the account number, the DSN, the log amount, and the truncated hash of the merchant ID along with the validation result, via path 122, to an access control server (ACS) 124 of the system 100. The ACS 124 is a server operated by the issuer 104, or on behalf of the issuer 104, as defined by the 3-D Secure™ specification implemented in this embodiment.

The ACS 124 is configured to assess a risk of the transaction based on the validation result along with other parameters received from the directory server 118. If on reviewing the validation result, the ACS 124 determines that the cryptogram was not valid, the ACS 124 is configured to further provide a challenge question, consistent with conventional techniques, to authenticate the customer 102, decline the transaction, or proceed otherwise, etc. When the customer 102 is authenticated, through the above risk-based assessment, or through the additional challenge question, or otherwise, the ACS 124 is configured to then generate the IAV based on a key(s) shared with the issuer 104, a cryptographic technique (e.g., a keyed hash (HMAC) function, etc.), and one or more of the account number, the DSN, the log amount, and the truncated hash of the merchant ID, or other data, etc. The IAV also includes a validation flag indicating if the cryptogram was validated or not. In this manner, for example, the IAV is specific to the customer 102, the merchant 106 and also the transaction (e.g., by the log amount, etc.), thereby inhibiting, generally, the IAV from being generated for one transaction and submitted in an authorization request for another transaction to the same or different merchant. The ACS 124 is configured to then transmit the IAV to the directory server 118, again, via path 122, as an authentication response (ARes).

Optionally, the ACS 124 may further authenticate the customer 102 through a challenge question when the risk based authentication suggests it even if the validation result is positive. In particular, as indicated by the dotted paths in FIG. 1, the ACS 124 may be configured to respond with the ARes to the directory server 118, along path 126, where the ARes further includes a challenge indicator (e.g., a network address to be called by the merchant 106, etc.). In this example, the directory server 118 may be configured to then receive the ARes from the ACS 124 and transmit the ARes to the merchant 106 (via the MPI 114 or 3DS server, etc.), via path 128. In turn, the merchant 106, and in particular, the virtual merchant location (e.g., the website, etc.) may identify the challenge indicator and call or otherwise invoke the challenge, thereby providing interaction, via path 130, between the customer's computing device 108 and the ACS 124. The interaction generally includes the presentation of a challenge question (e.g., Enter Your Personal Code, etc.), whereupon the customer 102 provides a response, via path 130. And, the ACS 124 is configured to confirm the response of the customer 102. Thereafter, when confirmed, the ACS 124 is configured, consistent with the above, to generate the IAV, and then generate a response including the IAV and transmit the response to the directory server 118, via path 126.

Upon receipt of the IAV from the ACS 124, the directory server 118 is configured to generate a message authentication code (MAC) for the full AAV (i.e., the data to be included in the AAV) (e.g., the DSN, the log amount, the truncated hash of the merchant ID, a currency code, a key ID, etc.), and then to compile a full AAV. The full AAV includes the IAV, the DSN, the amount and merchant information, and the signature information (e.g., the key ID and the MAC), the validation flag, etc. It should be appreciated that data included in the full AAV may vary based on the particular implementation thereof, whereby the full AAV may include more or less data, but will generally include the IAV from the ACS 124.

Thereafter, the directory server 118 is configured to provide the full AAV to the MPI 114, again via path 116. In turn, the merchant 106 is configured to compile an authorization request for the transaction, which includes the token or the account number for the customer's payment account, as appropriate, and also the full AAV. The merchant 106 is configured to then transmit the authorization request to acquirer 132, via path 134. The acquirer 132, in turn, is configured to transmit the authorization request to payment network 136, via path 138.

Upon receipt of the authorization request, the payment network 136 may be configured to interact with the DSS 110, via path 140 (although this is not required in all embodiments (e.g. where the payment network 136 knows the appropriate key(s), etc.)). Specifically, the payment network 136 may be configured to validate the MAC included in the full AAV and/or the full AAV itself. The payment network 136 may further be configured to otherwise validate and/or confirm the full AAV, or part thereof, for example, based on version information included in the full AAV.

Once validated, the payment network 136 is configured to provide the authorization request, or parts thereof, to the DSS 110. The DSS 110 is configured to confirm the validation of the cryptogram based on the DSN, when the DSRP cryptogram was previously validated by the DSS 110. Conversely, the DSS 110 is configured to locate the DSRP data for the transaction, by use of the DSN (or the ATC included therein) and to validate the DSRP data, as described above. In addition, the DSS 110 is also configured to decrypt and map the token included in the authorization request, if any, to the corresponding account number (e.g., PAN, etc.).

The DSS 110 is configured to then return the account number and a validation result to the payment network 136, via path 140. In connection with the above, the payment network 136 and/or the DSS 110 may be further configured to provide additional services to the transaction based on the payment account and/or the customer 102. For example, the DSS 110 may be configured to determine if one or more usage requirements of the token is satisfied (e.g., the token is permitted to be used in e-commerce, etc.), or, optionally, to check the transaction amount, name of the merchant, and currency, etc.

Thereafter, the payment network 136 is configured to provide the authorization request (including the account number and the validation result) to the issuer 104, along path 142. Then, the issuer 104 is configured to determine if the transaction should be approved or declined, and to respond accordingly, through the payment network 136. To do so, the issuer 104 is configured to validate the IAV based on one or more shared key(s) with the ACS 124. The IAV, more specifically, may be validated in the same manner it was generated above, for example, based on a secret key, the same cryptographic technique used by the ACS 124, and the account number, the DSN, the log amount, and the truncated hash of the merchant ID, or other data, etc. Additionally, or alternatively, the issuer 104 may be configured to leverage one or more network services (via the payment network 136, for example) that has already validated the AAV (as indicated by the validation result), in order to approve the transaction. The issuer 104 may be configured to validate the transaction amount (i.e., the amount indicated in the authorization request) based on the log amount from the AAV (or, optionally, the uncompressed amount), and also the transaction merchant (i.e., the merchant indicated in the authorization request) based on the truncated hash of the merchant ID from the AAV, etc. Once a determination is made, the issuer 104 is configured to transmit an authorization response (including the customer's account number) back to the payment network 136, along path 142. In turn, the payment network 136 is configured to route the authorization response (including the token or the account number) back to the acquirer 132, via path 138. The acquirer 132, in turn, is configured to provide the authorization response (including the token or the account number) back to the merchant 106, directly or via the MPI 114, along path 134.

At this point, the transaction is approved (in this example) and the merchant 106 may direct the selected product to be delivered to the customer 102.

Figure 5:
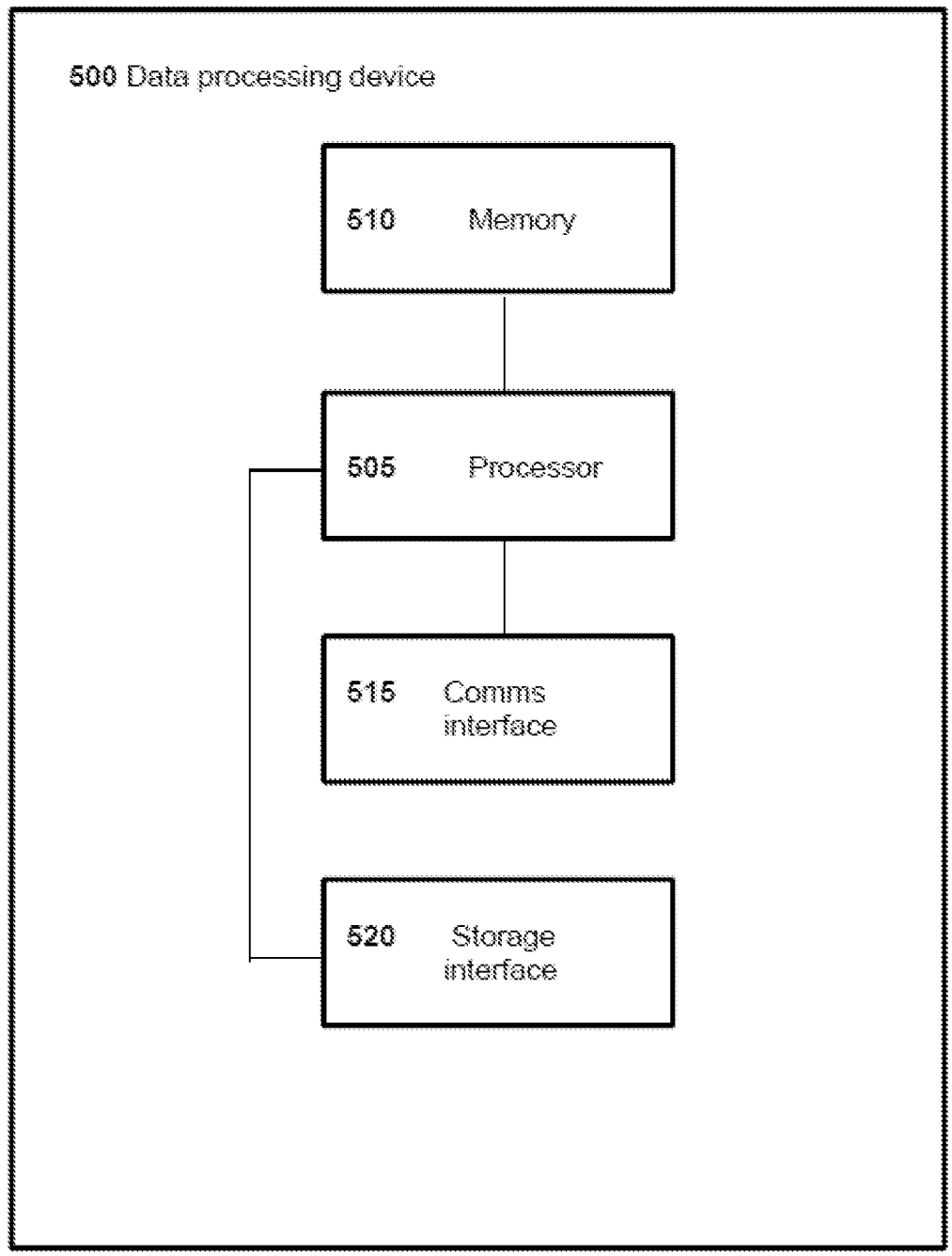
FIG. 5 shows in schematic form a data processing device that is suitable for performing the functions of any data processing device within the system of FIG. 1.

It should be appreciated that each of the issuer 104, the merchant 106, the computing device 108, the DSS 110, the MPI 114, the directory server 118, the ACS 124, the acquirer 132, and the payment network 136, etc., are implemented herein in one or more computing devices, such as a computing or data processing device 500 illustrated in FIG. 5. In connection therewith, the one or more computing devices are each in communication with one or more other entities via at least one network. In general, each of the paths included in FIG. 1, along which, or via which, messages are exchanged in the above description are representative of the network(s). The network(s) may include, without limitation, one or more local area networks (LANs), wide area networks (WANs) (e.g., the internet, etc.), mobile networks, virtual networks, other networks as described herein, and/or other suitable public and/or private networks capable of supporting communication among two or more of the illustrated parts, or even combinations thereof. In one example, a network includes multiple networks, where different ones of the multiple networks are accessible to different ones of the illustrated components in FIG. 1. In particular, the payment network 136 and the DSS 110 may be connected via a private network and, separately, the merchant 106 and the computing device 108 may be connected through a public network, such as the internet.

Figure 2:
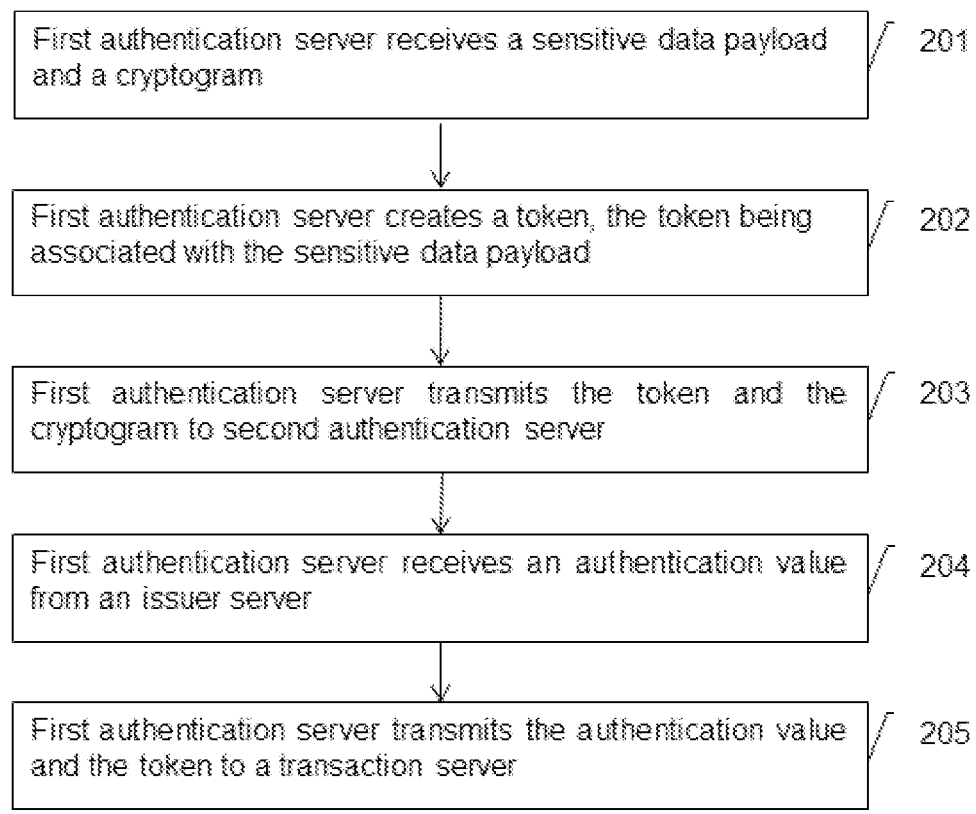
FIG. 2 is a flow diagram of steps performed by a first authentication server in the system of FIG. 1.

FIG. 2 is a flow diagram of steps performed by the MPI 114, also referred to as a first authentication server, in the system 100. At step 201, the first authentication server receives a sensitive data payload and a cryptogram. In the present embodiment, the MPI 114 associated with the merchant 106 receives a sensitive data payload and a cryptogram over the network. The sensitive data payload is received from the computing device 108 associated with the customer 102 via path 112. The sensitive data payload may comprise at least the customer account number (e.g. PAN) or a token corresponding to the customer account number, and/or one or more of customer's name, address, phone number, email address, etc. The data may be entered manually by the customer 102 or pre-stored in the computing device 108 or retrieved from a secure cloud server. The path 112 is generally a public internet, such as the internet which may be secured by one or more conventional means such as VPN. The MPI 114 also receives the cryptogram which may also be generated by the computing device 108 with the help of the DSS 110, as explained above. The cryptogram is dynamically generated for each transaction and therefore is a unique value. It may include the credentials of the merchant along with other information.

At step 202, the first authentication server creates a token from the sensitive data payload received from the computing device 108 in step 201. In the present embodiment, the token is usually derived from the customer account number and is an encrypted value. The token replaces the sensitive account number in the transaction for security reasons, as explained above. However, this step is omitted if the token is already provided by the wallet application.

At step 203, the first authentication server transmits the token and the cryptogram to a second authentication server. In the present embodiment, the MPI 114 is connected to the directory server 118 via a trusted channel and the token and the cryptogram included in the AReq are first passed to the directory server 118 via path 116, as explained above. The directory server 118 then passes the AReq to the DSS 110, referred to as the second authentication server.

At step 204, the first authentication server receives an authentication value from an issuer server. In the present embodiment, after the authentication from the ACS 124, the MPI 114 receives the full AAV from the ACS 124 via the directory server 118, as explained above.

At step 205, the first authentication server transmits the authentication value and the token to a transaction server. In the present embodiment, the MPI 114 generates an authorization request for the transaction to be approved by the issuer 104. The authorization request includes the token or the account number and the full AAV. The token may have a token expiry period associated with it for enhanced security. The authorization request is processed as described above and the transaction is finally approved by the issuer 104 routed via the payment network 136, referred to as the transaction server.

Figure 3:
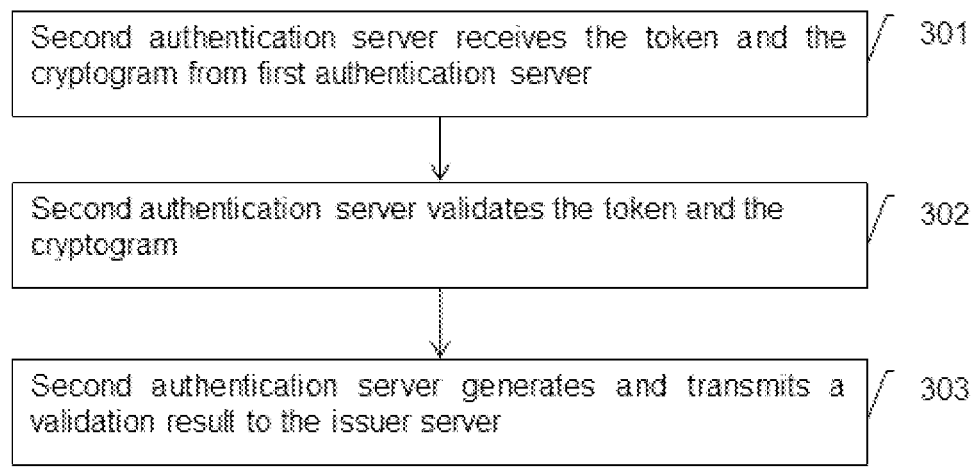
FIG. 3 is a flow diagram of steps performed by a second authentication server in the system of FIG. 1.

FIG. 3 is a flow diagram of steps performed by the second authentication server, or the DSS 110. At step 301, the second authentication server receives the token and the cryptogram from the first authentication server. In the present embodiment, the DSS 110 receives via path 120 the token and the cryptogram passed by the MPI 114 through the directory server 118.

At step 302, the second authentication server validates the token and the cryptogram. In the present embodiment, the DSS 110 decrypts or detokenizes the received token to inspect the underlying account number and validates it. The DSS 110 also validates the received cryptogram as it was involved in generating the cryptogram in the first place. Therefore, the DSS 110 would know if the cryptogram had been tampered with en-route on the network. Validation can comprise generating, by DSS 110, a cryptogram associated with the token or underlying account number that it encodes and comparing, by DSS 110, the generated cryptogram and the received cryptogram to determine whether they match. A mismatch may be an indication that eavesdropping, or some other form of tampering, has occurred in an attempt to commit fraud.

At step 303, the second authentication server generates and transmits a validation result to the issuer server. In the present embodiment, the DSS 110 generates a validation result which includes the result of validation of the token and the cryptogram. The validation result includes a verification value, or characters, for each of the token and the cryptogram. The DSS 110 then transmits the validation result along with the account number to the ACS 124 (associated with the issuer 104) via the directory server 118.

Advantageously, by providing both the token and cryptogram to DSS 110, it is possible to perform authentication in a manner that has not previously been available. The cryptogram provides an assurance that the transaction involves a genuine user beyond that afforded by a token. In this way, it is possible to increase the security of a transaction.

Figure 4:
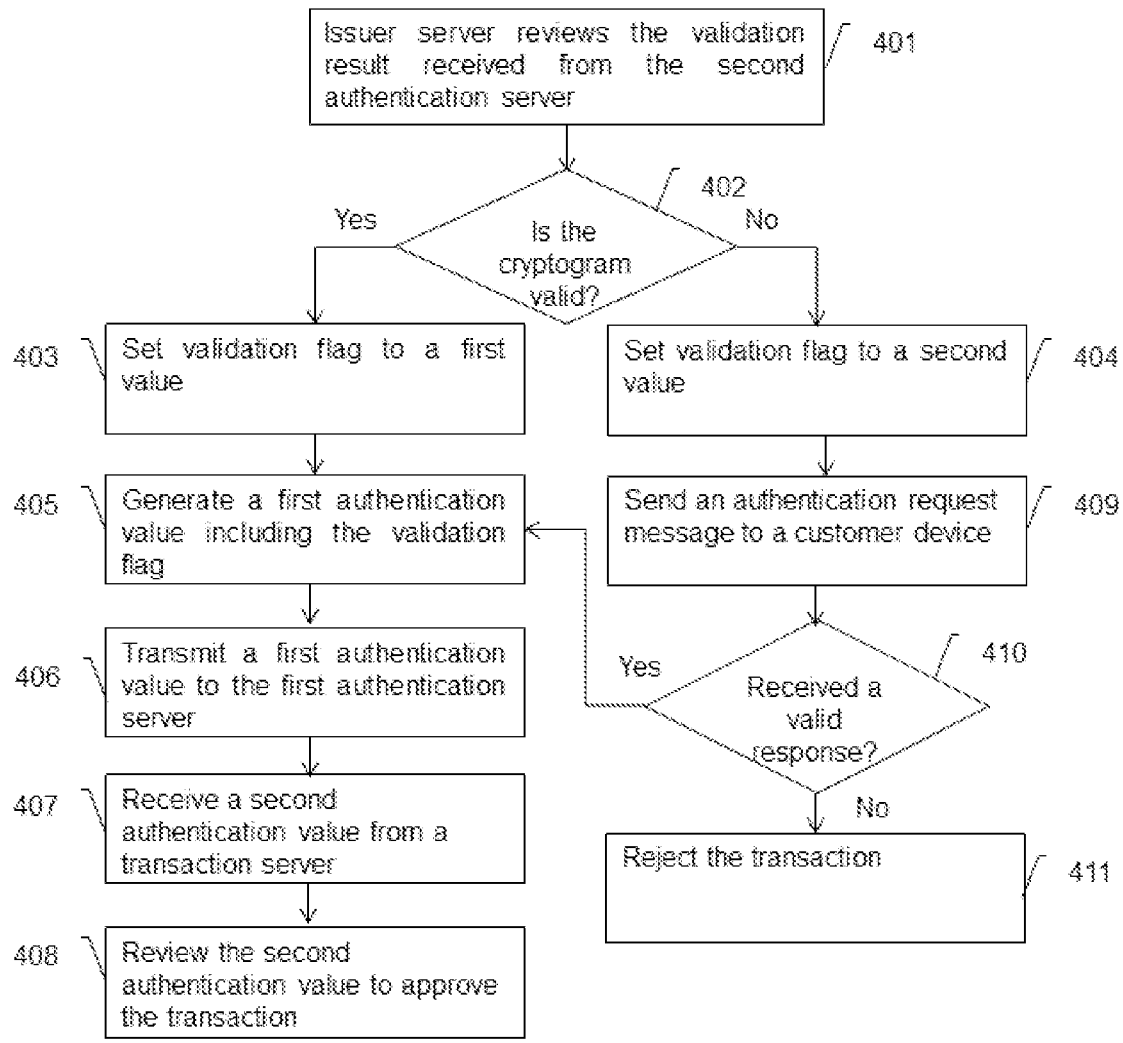
FIG. 4 is a flow diagram of steps performed by an issuer server in the system of FIG. 1.

FIG. 4 is a flow diagram of steps performed by the issuer server, or the ACS 124. At step 401, the issuer server reviews the validation result received from the second authentication server. In the present embodiment, the ACS 124 receives the validation result from the DSS 110 and reviews it.

At step 402, the issuer server determines if the cryptogram is valid or not. In the present embodiment, based on the review of the validation result, the ACS 124 determines whether the cryptogram was valid. It is to be noted that the ACS 124 does not receive or verify the cryptogram itself but only the result of its validation made by the DSS 110. If the ACS 124 finds out that the cryptogram was valid, it proceeds to follow the instructions at step 403 or else to follow the instructions at step 404.

At step 403, the issuer server sets a validation flag to a first value. In the present embodiment, if the ACS 124 determines that the cryptogram was valid, it sets a validation flag with a first value, say '1', indicating that the cryptogram was correctly verified.

At step 405, the issuer server generates a first authentication value including the validation flag. In the present embodiment, if the ACS 124 generates an issuer authentication value (IAV), as explained above, which includes the validation flag. As the IAV is only populated with an extra bit of validation flag, the size of the IAV is not considerably increased but the security of the transaction is enhanced using an extra bit of authentication information contained in the validation flag.

At step 406, the issuer server transmits the first authentication value to the first authentication server. In the present embodiment, the ACS 124 sends an authentication response (ARes) including the IAV, as explained above, to the directory server 118 which creates a second authentication value, or the full AAV, and sends it to the MPI 114.

At step 407, the issuer server receives the second authentication value from a transaction server. In the present embodiment, the ACS 124 receives the full AAV back from the payment network 136 for final authorization. The full AAV is sent along with the customer information, such as the account number, name, address, etc.

At step 408, the issuer server reviews the second authentication value to approve the transaction. In the present embodiment, the ACS 124 reviews the received AAV and the customer information and authorizes the transaction if everything is received as expected. As the cryptogram was verified previously, the transaction is deemed to be secure by the issuer 104.

On the other hand, if the cryptogram was not valid, then at step 404, the issuer server sets the validation flag to a second value. In the present embodiment, upon determining that the cryptogram was not valid, the ACS 124 sets the validation flag to a simple value, say '0', indicating that the cryptogram was not validated.

At step 409, the issuer server sends an authentication request message to a customer device. In the present embodiment, when the cryptogram was not valid, the ACS 124 performs an additional authentication step, referred to as step-up, to verify the customer and the authenticity of the transaction being made. In order to do so, the ACS 124 generates an authentication message to be sent to the customer device 108. This authentication message can be in the form of a one-time password (OTP) that is sent to the customer device 108 or any other registered device owned by the customer 102. The customer 102 is then asked to enter the received password on the payment portal being used for the transaction. Alternatively, OTP can be provided in an automated call made to the customer device. Instead or in addition, other verification data may also be requested from the customer, such as date of birth, postcode, secret or memorable word, etc.

At step 410, the issuer server determines if a valid response has been received, or not. In the present embodiment, the ACS 124 awaits a response from the customer 102 which may be in the form of receiving back the OTP, or other requested information, through the payment portal. There may be a time-out period for receiving such response from the customer 102. If the customer does not reply in the set time period, the transaction may be declined or the customer may be given another opportunity to respond.

If a valid response is not received after a predetermined amount time and/or number of attempts has lapsed, then at step 411, the transaction is rejected by the ACS 124. A message informing the customer 102 of unsuccessful transaction may be displayed on the payment portal. Also, the merchant 106 is also informed that the transaction was unsuccessful.

However, if a valid response is received from the customer, then the issuer server proceeds to follow the instructions at steps 405 to 408 as explained above. In the present embodiment, the ACS 124 follows the steps needed to complete the authorization process to get the transaction approved.

In the above process, the ACS 124 can optionally step-up even if the cryptogram is determined to be valid in step 402. This could especially be done when the transaction amount is high, the type of transaction being made is unusual for the customer, or the merchant is new and unknown to the issuer.

As described above, the present disclosure uses cryptogram to provide an extra layer of security without making the transaction approval process cumbersome or resource intensive. Specifically, as the cryptogram is verified by the DSS beforehand, the cryptogram itself need not be sent to the issuer for verification and by simply setting a validation flag it is possible to authenticate the transaction. Moreover, under normal circumstances, as the issuer is no longer required to step-up, it saves network and device resources at both the issuer and the customer end. The disclosure therefore enables faster yet secure transactions, thereby improving the overall customer experience.

Optionally, any embodiment of the disclosure can make use of an additional token referred to as a 'dynamic token'. The dynamic token can be transmitted in addition to and alongside the token described above. For ease of differentiation, the token discussed above is referred to in the following description as a 'static token'.

The dynamic token contains additional parameters beyond those present in the static token, and in particular the dynamic token contains parameters that are dynamic in the sense that they vary from transaction to transaction. This is in contrast to the static token which represents the same PAN, for example, in a plurality of transactions.

The dynamic token can thus be characterized in that it contains information that is specific to a particular transaction and which is subject to change from transaction to transaction. The dynamic token is thus not, for example, a PAN, a tokenized PAN (tPAN), or other such static information, such as a card expiry date, or Card Verification Value (CCV) number.

The dynamic token can be created by a wallet or merchant at the start of a transaction and passed to an authentication server, which may then transmit the dynamic token to a directory server for actioning. An unused data element, e.g. the DE124 data element of an ISO 8583 message, can be used to hold the dynamic token.

The dynamic token contains any combination of the following information: (a) Security information: cardholder identity (e.g., name, address, biometric information); transaction validity information; dynamic token validity information; location information of the cardholder and/or the merchant; historic transaction information for a given cardholder (e.g., transaction frequency and/or time intervals between transactions); and/or a secret code created during the generation of the dynamic token to enable the authenticity of the dynamic token to be verified. The purpose of the security information is to enhance the security of a transaction by providing supplemental information that aids in verifying the authenticity of the transaction and particularly the authenticity of the static token. (b) Loyalty information: Cardholder loyalty points total and/or loyalty points to be added to a loyalty account associated with the cardholder; a merchant identification code corresponding to the merchant carrying out the transaction (this may be a MID); a bonus percentage specifying a modifier to the amount of loyalty points to be added to the cardholder's loyalty account; a membership tier of the cardholder; and/or information suitable for verifying the authenticity of the loyalty information. The loyalty information is used to personalize the transaction experience for a given cardholder, e.g., automatically adding loyalty points to the cardholder's loyalty account. (c) Offer information: Discount percentage; time validity for discount percentage; maximum number of transactions permitted to make use of discount percentage; product(s) qualifying for discount percentage. The offer information is used to enable a merchant to easily put an offer in place in real time and for specified time duration only. (d) Control information: One or more locations (e.g., merchant stores) where dynamic tokens can be validly used; one or more merchant category codes (MCCs) indicating merchant classifications where the dynamic token can be validly used; a maximum number of transactions where the dynamic token can be validly used; a transaction count indicating the number of transactions that the dynamic token has been involved in; and/or a maximum transaction value (net or gross) for transactions in which the dynamic token can be validly used.

The dynamic token can be formed of more than one token, e.g., a security dynamic token and a control dynamic token. In such cases, the collection of all such dynamic tokens is transmitted alongside the static token.

The directory server 118 may be configured to receive a dynamic token and act upon it, where the specific action(s) taken is/are dependent on the information content of the dynamic token. For example, the directory server 118 may be configured to: receive the dynamic token; read information stored in the dynamic token; and perform a further action based on the information that was read. The further action can include any one or more of: applying a discount to the transaction; flagging the transaction as being made at an invalid merchant; flagging a transaction amount in excess of a maximum transaction amount; flagging a transaction as suspicious based on a location of the cardholder and/or merchant; adding one or more loyalty points to a loyalty account associated with the cardholder; and appending the transaction information to a transaction log associated with the cardholder. Further actions will become apparent to a skilled person having the benefit of the present disclosure.

It will be appreciated that any of the methods described herein, and any particular step of said methods, can be implemented by a computer. Such implementation may take the form of a processor executing instructions stored on a non-transitory computer-readable medium or media, wherein when executed the instructions cause the processor to perform any one or more steps of any of the methods described herein. Individual steps of a method may be implemented by different processors that are all collectively acting in accordance with computer-readable instructions stored on one or more storage media. The processor or processors may be component(s) of system 100, for example a processor of the MPI 114, the DSS 110, or the ACS 124. Equally, any steps of any of the methods described herein may be performed by data processing devices as described in respect of system 100 of FIG. 1. By way of example, FIG. 5 shows in schematic form a data processing device 500 that is suitable for performing the functions of the processing devices and servers in the system 100.

Data processing device 500 includes a processor 505 for executing instructions. Instructions may be stored in a memory 510, for example. Processor 505 may include one or more processing units (e.g., in a multi-core configuration) for executing instructions. The instructions may be executed within a variety of different operating systems on the data processing device 500, such as UNIX, LINUX, Microsoft Windows®, etc. More specifically, the instructions may cause various data manipulations on data stored in memory 510 (e.g., create, read, update, and delete procedures). It should also be appreciated that upon initiation of a computer-implemented method, various instructions may be executed during initialization. Some operations may be required in order to perform one or more methods described herein, while other operations may be more general and/or specific to a particular programming language (e.g., C, C#, C++, Java, or other suitable programming languages, etc.).

Processor 505 is operatively coupled to a communication interface 515 such that data processing device 500 is capable of communicating with a remote device, such as another data processing device of system 100. For example, communication interface 515 may receive communications from another member of system 100 over the network, depending on the function of data processing device 500 within the context of system 100.

Processor 505 may also be operatively coupled to a storage device such as a secure storage medium, depending on the function of data processing device 500 within the context of system 100. The storage device is any computer-operated hardware suitable for storing and/or retrieving data, where in the case of a secure storage medium the data is stored and retrieved securely.

Storage device can be integrated in data processing device 500, or it can be external to data processing device 500 and located remotely. For example, data processing device 500 may include one or more hard disk drives as a storage device. Alternatively, where the storage device is external to data processing device 500, it can comprise multiple storage units such as hard disks or solid state disks in a redundant array of inexpensive disks (RAID) configuration. The storage device may include a storage area network (SAN) and/or a network attached storage (NAS) system.

Processor 505 can be operatively coupled to the storage device via a storage interface 520. Storage interface 520 is any component capable of providing processor 505 with access to the storage device. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to the storage device.

Memory 510 may include, but is not limited to, random access memory (RAM), such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense. While the disclosure has been described in terms of various specific embodiments, those skilled in the art will recognize that the disclosure can be practiced with modification within the scope of the claims.

As used herein, the term "non-transitory computer-readable media" is intended to be representative of any tangible computer-based device implemented in any method or technology for short-term and long-term storage of information, such as, computer-readable instructions, data structures, program modules and submodules, or other data in any device. Therefore, the methods described herein may be encoded as executable instructions embodied in a tangible, non-transitory, computer readable medium, including, without limitation, a storage device, and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and non-volatile media, and removable and non-removable media, such as a firmware, physical and virtual storage, CD-ROMs, DVDs, and any other digital source, such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is enabling sensitive data, such a cryptogram to be passed to the devices in a secure manner. Any such resulting program, having computer-readable code means, may be embodied or provided within one or more computer readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, and as described, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the term "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for authenticating a transaction over a secure network, the method comprising:
    prior to authorization of a transaction:
        receiving, by a digital service server, from a merchant plug-in (MPI) computing device, via a directory server, a token and a first cryptogram for the transaction, the first cryptogram unique to the transaction; and then decrypting, by the digital service server, the token into sensitive data;
        diversifying, by the digital service server, a master key from an issuer master symmetric key, which is specific to an issuer;
        diversifying, by the digital service server, one or more session keys from the diversified master key based on an application transaction count (ATC);
        validating, by the digital service server, the first cryptogram, based on the one or more diversified session keys; and then
        based on the first cryptogram being validated:
            incrementing, by the digital service server, the ATC; and
            generating, by the digital service server, a first message including a validation result and the sensitive data; and then
        transmitting, by the digital service server, the first message to an issuer server of the issuer to authenticate the transaction.

2. The computer-implemented method of claim 1, wherein the validation result includes a first verification value indicative of successful validation of the first cryptogram.

3. The computer-implemented method of claim 2, further comprising:
    validating, by the digital service server, the token; and
    wherein the validation result includes a second verification value indicative of successful validation of the token.

4. The computer-implemented method of claim 1, further comprising:
    receiving, by the MPI computing device, from a computing device associated with a customer, the sensitive data and the first cryptogram;
    generating, by the MPI computing device, the token for the sensitive data; and
    transmitting, by the MPI computing device, an authentication request to the digital service server, via the directory server, the authentication request including the token and the first cryptogram, but not the sensitive data.

5. The computer-implemented method of claim 4, wherein the sensitive data includes an account number and one or more of: a customer name, a customer address, a merchant name, and/or a merchant address.

6. The computer-implemented method of claim 4, further comprising:
    receiving, by the MPI computing device, based on the first message, an authentication value from the issuer server, via the directory server; and
    transmitting, by the MPI computing device, the authentication value and the token to the issuer server.

7. The computer-implemented method of claim 6, wherein the authentication value further includes one or more of: a directory service nonce (DSN), a log amount for the transaction, a truncated hash of a merchant ID for a merchant involved in the transaction, and/or a currency code.

8. A system for authenticating a transaction on a secure network, the system comprising:
    a digital service server including a first processor and a first non-transitory memory, the first non-transitory memory including first executable instructions, which, when executed by the first processor, cause the first processor to:
    prior to authorization of a transaction:
        receive, from a merchant plug-in (MPI) computing device, via a directory server, a token and a first cryptogram for the transaction, the first cryptogram unique to the transaction; and then
        decrypt the token into sensitive data;
        diversify a master key from an issuer master symmetric key, which is specific to an issuer;
        diversify one or more session keys from the diversified master key, based on an application transaction count (ATC);
        validate the first cryptogram, based on the one or more diversified session keys; and then
        based on the first cryptogram being validated:
            increment the ATC; and
            generate a first message including a validation result and the sensitive data; and then transmit the first message to an issuer server to authenticate the transaction.

9. The system of claim 8, wherein the validation result includes a first verification value indicative of successful validation of the first cryptogram.

10. The system of claim 9, wherein the first executable instructions, when executed by the first processor, further cause the first processor to validate the token; and wherein the validation result includes a second verification value indicative of successful validation of the token.

11. The system of claim 8, further comprising the MPI computing device, which includes a second processor and a second non-transitory memory, the second non-transitory memory including second executable instructions, which, when executed by the second processor, cause the second processor to:

receive the sensitive data and the first cryptogram;

generate the token for the sensitive data; and transmit an authentication request to the digital service server, via the directory server, the authentication request including the token and the first cryptogram, but not the sensitive data.

12. The system of claim 11, wherein the sensitive data includes an account number and one or more of: a customer name, a customer address, a merchant name, and/or a merchant address.

13. The system of claim 11, wherein the second executable instructions, when executed by the second processor, further cause the second processor to:

receive an authentication value, which is based on the first message, from the issuer server, via the directory server; and transmit the authentication value and the token to the issuer server.

14. The system of claim 13, wherein the authentication value further includes one or more of: a directory service nonce (DSN), a log amount for the transaction, a truncated hash of a merchant ID for a merchant involved in the transaction, and/or a currency code.

* * * * *